(12) United States Patent
Balakrishnan et al.

(10) Patent No.: US 11,334,507 B2
(45) Date of Patent: May 17, 2022

(54) METHOD AND SYSTEM FOR COMMUNICATING DATA PACKETS IN REMOTE DIRECT MEMORY ACCESS NETWORKS

(71) Applicant: SAMSUNG ELECTRONICS CO., LTD., Suwon-si (KR)

(72) Inventors: Suman Prakash Balakrishnan, Bangalore (IN); Muthazhagan Balasubramani, Bangalore (IN); Prakash Babu Vemula, Bangalore (IN); Raphel David Johnson, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/120,491

(22) Filed: Dec. 14, 2020

(65) Prior Publication Data

US 2022/0058146 A1 Feb. 24, 2022

(30) Foreign Application Priority Data

Aug. 21, 2020 (IN) .............................. 202041036166

(51) Int. Cl.
*G06F 13/28* (2006.01)
*G06F 3/06* (2006.01)

(52) U.S. Cl.
CPC ............ *G06F 13/28* (2013.01); *G06F 3/0604* (2013.01); *G06F 3/0655* (2013.01); *G06F 3/0679* (2013.01); *G06F 2213/28* (2013.01)

(58) Field of Classification Search
CPC ......... G06F 15/173; G06F 13/28; H04L 12/28
See application file for complete search history.

(56) References Cited

U.S. PATENT DOCUMENTS

| | | | |
|---|---|---|---|
| 6,963,576 B1* | 11/2005 | Lee | ........................ H04L 47/10 370/395.4 |
| 7,346,001 B1* | 3/2008 | Zhang | ................. H04L 47/2416 370/235 |
| 2012/0131124 A1* | 5/2012 | Frey | .................... H04L 67/1097 709/212 |

(Continued)

OTHER PUBLICATIONS

Harsha Bharadwaj, J Metz, "FC-NVMe Queue Arbitration Mapping Controller Arbitration mechanisms to the FC fabric"; https://standards.incits.org/apps/group_public/download.php/93804/T11-2017-00385-v000.pdf.

(Continued)

*Primary Examiner* — Getente A Yimer
(74) *Attorney, Agent, or Firm* — F. Chau & Associates, LLC

(57) ABSTRACT

The present disclosure describes a method and a system for sending data packets to improve Quality of Service in Non-Volatile Memory express (NVMe) aware Remote Direct Memory Access (RDMA) network, including receiving, by a host RNIC, RDMA command from a host initiator, wherein the RDMA command comprises data packets, arranging, by the host RNIC, the data packets based on weights and priorities of RDMA queue pairs, storing, by the host RNIC, the data packets in a host queue from host RDMA queue pairs based on the weights and priorities of the RDMA queue pairs, and sending, by the host RNIC, the data packets through host virtual lanes to a target RNIC.

15 Claims, 5 Drawing Sheets

(56) References Cited

U.S. PATENT DOCUMENTS

2017/0168986 A1* 6/2017 Sajeepa .............. G06F 15/17331
2017/0255642 A1   9/2017 Ben Dayan et al.
2017/0286363 A1* 10/2017 Joshua .............. G06F 15/17331
2018/0095915 A1   4/2018 Prabhakar et al.
2018/0307650 A1* 10/2018 Kachare ............ G06F 15/17331

OTHER PUBLICATIONS

Harsha Bharadwaj, J Metz, FC-NVMe Queue Arbitration Revision:3 (Proposal Text for inclusion into standards); https://standards.incits.org/apps/group_public/download.php/95314/T11-2018-00031-v000.pdf.

* cited by examiner

METHOD AND SYSTEM FOR COMMUNICATING DATA PACKETS IN REMOTE DIRECT MEMORY ACCESS NETWORKS

CROSS-REFERENCE

The present application claims priority under 35 U.S.C. § 119 to Indian patent application number 202041036166 filed on Aug. 21, 2020 in the Indian Patent Office, the entire disclosure of which is incorporated by reference.

FIELD

The present disclosure generally relates to the field of data transmissions, and more particularly relates to a method and system to communicate data packets in Non-Volatile Memory express (NVMe)-aware Remote Direct Memory Access (RDMA) networks.

DISCUSSION OF RELATED ART

In Remote Direct Memory Access (RDMA) systems, a host RDMA-enabled Network Interface Controller (RNIC) and a target RNIC may communicate data packets using queue pairs. Both the host RNIC and the target RNIC may each generate their own RDMA queue pairs and arbitration policies. These queue pairs are preferably aligned with each other so there is no mismatch in the queue pairs. With the advent of Non-Volatile Memory express (NVMe) support over RDMA systems, an NVMe-aware memory device may be connected to a host RNIC through a target RNIC. In such situations, the memory device may generate its own queue pairs and arbitration policies which may be different from the arbitration policies set in the host RNIC and/or the target RNIC. As a result, this may lead to a mismatch in the arbitration policies between the host RNIC, the target RNIC, and/or the target memory device. The information disclosed in this section is only for enhancement of understanding of the generally related art and should not be taken as an indication of prior art for examination purposes.

SUMMARY

In an embodiment of the present disclosure, a method for sending data packets by a host remote network interface controller (RNIC) in a Non-Volatile Memory express (NVMe)-aware Remote Direct Memory Access (RDMA) network may include receiving, by the host RNIC, an RDMA command from an initiating host or host initiator, wherein the RDMA command includes data packets, arranging, by the host RNIC, the data packets based on weights and priorities of RDMA queue pairs, storing, by the host RNIC, the data packets in a host queue from host RDMA queue pairs based on the weights and priorities of the RDMA queue pairs, and sending, by the host RNIC, the data packets through host RNIC virtual lanes to a target RNIC.

In an embodiment of the present disclosure, a method for receiving data packets by a target RNIC in an NVMe-aware RDMA network. may include receiving, by a target RNIC, data packets from a host RNIC, arranging, by the target RNIC, the data packets based on weights and priorities of RDMA queue pairs, storing, by the target RNIC, the data packets in a target RNIC queue from target RDMA queue pairs based on the weights and priorities of the RDMA queue pairs, and sending, by the target RNIC, the data packets using a virtual lanes vendor arbitration format (VLVAF) of the target RNIC to an NVMe-aware solid-state drive (SSD).

In an embodiment of the present disclosure, a host RNIC for sending data packets in an NVMe-aware RDMA network may include a processor and a memory communicatively coupled to the processor, wherein the memory stores processor-executable instructions, which on execution, cause the processor to receive an RDMA command from a host initiator, wherein the RDMA command includes data packets, and further cause the processor to arrange the data packets based on weights and priorities of RDMA queue pairs, store the data packets in a host queue from host RDMA queue pairs based on the weights and priorities of the RDMA queue pairs, and send the data packets through host virtual lanes to a target RNIC.

In an embodiment, the present disclosure may relate to a target RNIC for receiving data packets in NVMe aware RDMA network. The target RNIC including a processor and a memory communicatively coupled to the processor, wherein the memory stores processor-executable instructions, which on execution, cause the processor to receive data packets from a host remote network interface controller (RNIC), arrange the data packets based on weights and priorities of RDMA queue pairs, store the data packets in a target queue from target RDMA queue pairs based on the weights and priorities of the RDMA queue pairs, and send the data packets through target virtual lanes to an NVMe-aware solid-state drive (SSD).

In an embodiment of the present disclosure, a method for sending data packets by a host remote network interface controller (RNIC) in a Remote Direct Memory Access (RDMA) network includes: receiving, by the host RNIC, an RDMA command, wherein the RDMA command comprises data packets; arranging, by the host RNIC, the data packets based on weights and priorities of RDMA queue pairs in accordance with an arbitration format; storing, by the host RNIC, the data packets in a host queue from the host RDMA queue pairs based on the weights and priorities of the RDMA queue pairs; and sending, by the host RNIC, the data packets through host virtual lanes to the RDMA network.

In an embodiment of the present disclosure, a method for receiving data packets by a target remote network interface controller (RNIC) in a Remote Direct Memory Access (RDMA) network includes: receiving, by the target remote network interface controller (RNIC), data packets from a network; arranging, by the target RNIC, the data packets based on weights and priorities of RDMA queue pairs in accordance with an arbitration format; storing, by the target RNIC, the data packets in a target queue from target RDMA queue pairs based on the weights and priorities of the RDMA queue pairs; and sending, by the target RNIC, the data packets using virtual lanes based on the arbitration format to a remote memory device.

In an embodiment of the present disclosure, a host remote network interface controller (RNIC) for sending data packets in a Non-Volatile Memory express (NVMe)-aware Remote Direct Memory Access (RDMA) network includes: a processor; and a memory communicatively coupled to the processor, wherein the memory stores processor-executable instructions, which on execution, cause the processor to: receive an RDMA command from a host initiator, wherein the RDMA command comprises data packets; arrange the data packets based on weights and priorities of RDMA queue pairs; store the data packets in a host queue from host RDMA queue pairs based on the weights and priorities of the RDMA queue pairs; and send the data packets through host virtual lanes to a target RNIC.

In an embodiment of the present disclosure, a target remote network interface controller (RNIC) for receiving data packets in Non-Volatile Memory express (NVMe)-aware Remote Direct Memory Access (RDMA) network includes: a processor; and a memory communicatively coupled to the processor, wherein the memory stores processor-executable instructions, which on execution, cause the processor to: receive data packets from a host remote network interface controller (RNIC); arrange the data packets based on weights and priorities of RDMA queue pairs; store the data packets in a target queue from target RDMA queue pairs based on the weights and priorities of the RDMA queue pairs; and send the data packets through target virtual lanes to an NVMe-aware solid-state drive (SSD).

The foregoing summary is illustrative rather than limiting. In addition to the illustrative aspects, embodiments, and features described above, further aspects, embodiments, and features will become apparent by reference to the drawings and descriptions below.

BRIEF DESCRIPTION OF THE DRAWINGS

The accompanying drawings, which are incorporated in and constitute a part of this disclosure, illustrate exemplary embodiments and, together with the descriptions, serve to explain the disclosed principles. In the figures, the left-most digit(s) of a reference number may identify the figure in which the reference number first appears. The same or like reference numbers may be used throughout the figures to reference the same or like features and components. Some exemplary embodiments of the present subject matter are now described below, by way of example only, and with reference to the accompanying figures, where.

Figure 1:
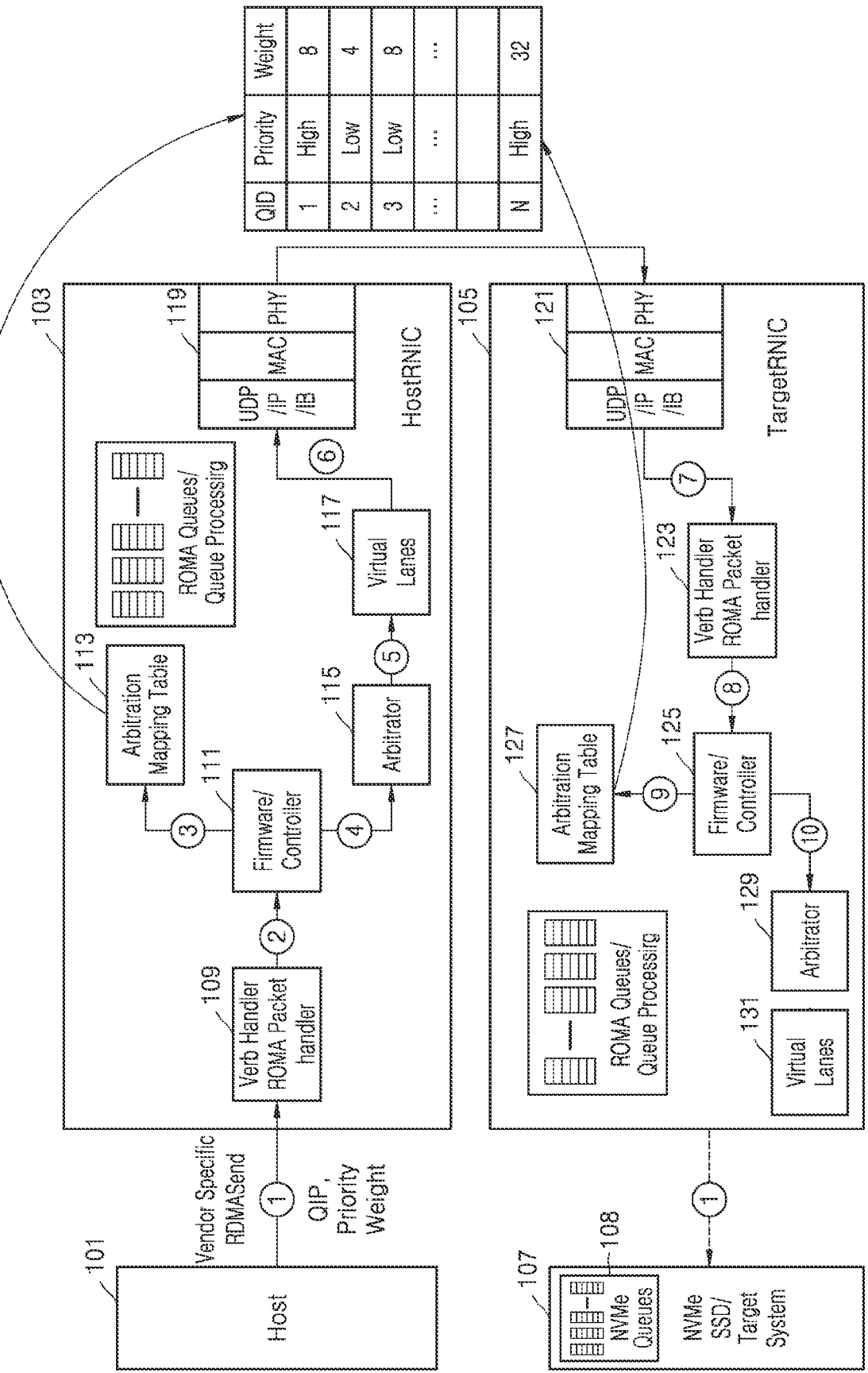
FIG. 1 is a hybrid schematic block diagram with table illustrating initialization of Remote Direct Memory Access (RDMA) queues in a host remote network interface controller (RNIC) and a target RNIC in a Non-Volatile Memory express (NVMe)-aware Remote Direct Memory Access (RDMA) network in accordance with an exemplary embodiment of the present disclosure.

It should be appreciated by those skilled in the art that block diagrams depicted herein represent conceptual views of illustrative systems embodying principles of the present subject matter. Similarly, it will be appreciated that any flowcharts, flow diagrams, state transition diagrams, pseudo code, and the like represent various processes which may be substantially represented in a computer readable medium and executed by a computer or processor, whether or not such computer or processor is explicitly shown.

DETAILED DESCRIPTION

In the present disclosure, the word "exemplary" is used herein to mean "serving as an example, instance, or illustration." Any embodiment or implementation of the present subject matter described herein as "exemplary" is not to be construed as necessarily preferred or advantageous over any other embodiments, but has been provided for ease of understanding. Whether or not specifically termed "exemplary", all embodiments disclosed herein are exemplary in nature rather than limiting.

While the teachings of the present disclosure are susceptible to various modifications and alternative forms, a specific embodiment thereof has been shown by way of example in the drawings and described in detail below. It should be understood, however, that the described embodiment is not intended to limit the claims to the particular forms disclosed, but on the contrary, the claims may cover all modifications, equivalents, and alternatives falling within the scope and spirit of the disclosure.

Remote Direct Memory Access (RDMA) technology allows computers connected in a network to access each other's memories directly without utilizing computer components such as processors, a memory cache or an operating system. Non-Volatile Memory express (NVMe)-aware RDMA network technology allows non-volatile memory devices such as Solid-State Drives (SSD) to connect to a computer's Peripheral Component Interconnect Express (PCIe) slot, for example, and exchange data packets with the computers connected in the network. Embodiments of the present disclosure relate to a method and a system to communicate data packets by a remote network interface controller (RNIC) in NVMe-aware RDMA networks. Here, a host device communicates data packets with a target device using a protocol and queue pairs. These queue pairs have relative priorities and weights. Based on the priorities and weights of the queue pairs, the data packets are communicated to the target device. The host device contains an RNIC called the host RNIC, which creates queue pairs. Similarly, the target device contains an RNIC called the target RNIC, which also creates queue pairs. The host RNIC and the target RNIC may be hardware components connected to, for example, Peripheral Component Interconnect (PCI) slots contained in the host device and the target device, respectively. The host RNIC and target RNIC may be connected in a wired manner for data communication, without limitation. That is, embodiments are not limited to wires and may be wholly or partially wireless. The queue pairs created at the host RNIC and the target RNIC are preferably aligned, and may be set per RDMA specification standards. Embodiments of the present disclosure are not necessarily limited to PCI or PCIe, but may optionally be applied to like interfaces such as, but not limited to, dual-port SATA Express (two or more lanes), dual-port SAS (two or more lanes), multi-link SAS (four or more lanes), four-port PCIe (four or more lanes), or the like.

In legacy RDMA systems, for example, the queue pairs transmitted between the host RNIC and the target RNIC may use an RNIC's vendor-specific method for queue arbitration. However, with the arrival of NVMe support over RDMA networks, the RDMA legacy features may fail to comprehend the advanced NVMe features such as, for example, Weighted Round Robin (WRR) for queue arbitration. As a consequence, the priorities of queue pairs in the host RNIC and the target RNIC might be mis-aligned with queue pairs of an NVMe-aware SSD, for example. This leads to mismatches at a priority level affecting queue pairs, and consequently affecting the data packets in their order of execution.

The present disclosure provides efficient mechanisms for preventing the above-mentioned mis-alignments and/or mismatches by storing queue arbitration settings of the RDMA queue pairs matching the queue arbitration settings of the NVMe-aware SSD in an arbitration mapping table of both the target RNIC and the host RNIC. IN the descriptions that follow, the following Table 1 sets forth the reference numerals to be used:

TABLE 1

| Reference No. | Description |
|---|---|
| 101 | Host |
| 103 | Host RNIC |
| 105 | Target RNIC |
| 107 | NVMe SSD/Target system |
| 109 | Verb handler/RDMA packet handler (Host side) |
| 111 | Firmware/Controller (Host side) |
| 113 | Arbitration mapping table (Host side) |
| 115 | Arbitrator (Host side) |
| 117 | Virtual lanes (Host side) |
| 119 | UDP/IP/IB, MAC, PHY (Host side) |
| 121 | UDP/IP/IB, MAC, PHY (Target side) |
| 123 | Verb handler/RDMA packet handler (Target side) |
| 125 | Firmware/Controller (Target side) |
| 127 | Arbitration mapping table (Target side) |
| 129 | Arbitrator (Target side) |
| 131 | Virtual lanes (Target side) |
| 201 | RDMA queues (Host side) |
| 203 | Host queue |
| 205 | RDMA queues (Target side) |
| 207 | Target queue |
| 301 | High priority applications and IOs |
| 303 | Medium priority applications and IOs |
| 305 | Low priority applications and IOs |
| 307 | QP1 |
| 309 | QP2 |
| 311 | QP3 |
| 313 | WRR |
| 315 | FIFO |
| 317 | High priority virtual lanes |
| 319 | Low priority virtual lanes |
| 321 | WRR |

FIG. 1 illustrates initialization of RDMA queues in a host RNIC and a target RNIC in an NVMe-aware RDMA network in accordance with an embodiment of the present disclosure. With reference to the FIG. 1, the initialization is explained for a process involving population of an arbitration mapping table with information contained in a vendor-specific command.

As shown in the FIG. 1, a host 101 is communicatively coupled to a host RNIC 103, which is communicatively coupled to a target RNIC 105, which, in turn, may be communicatively coupled to an NVMe SSD/target system 107. As used herein, the symbol "I" means "and/or" (i.e., an inclusive "or"). The host 101 may also be referred as an initiating host, host initiator, or a host device. The host 101 is a device that may initiate generic RDMA commands and vendor-specific RDMA commands. The generic RDMA commands may include data packets; and the vendor-specific RDMA commands may include priorities of RDMA queue pairs, weights of RDMA queue pairs, and queue identifiers (QID or QIP). The generic and vendor-specific RDMA commands may be referred to collectively as Work Queue Elements (WQEs). The data packets may have different priorities, such as, for example, high priority, medium priority or low priority. Prior to an RNIC initialization process, the host 101 may read or receive vendor-specific queue arbitration settings of the NVMe-aware SSD 107 using a virtual lanes vendor arbitration format (VLVAF) matching that of the NVMe queues 108. For example, the host 101 may receive the vendor-specific queue arbitration settings from a user in a vendor-specific implementation method.

In the initialization process, the host 101 may transmit to the host RNIC 103 a vendor-specific RDMA command as a first signal 1 based on the queue arbitration settings of the NVMe-aware SSD. More specifically, the vendor-specific RDMA command may include the priorities of RDMA queue pairs, the weights of RDMA queue pairs and the QID. The host RNIC 103 includes components such as a verb handler/RDMA packet handler 109, a firmware/controller 111, an arbitration mapping table 113, an arbitrator 115, virtual lanes 117 and Open Systems Interconnection (OSI) model layers 119.

The host RNIC 103 may receive signal 1 including the vendor-specific RDMA command sent from the host 101. The verb handler/RDMA packet handler 109 of the host RNIC 103 may remove a protocol header and/or footer from the vendor-specific RDMA command. The vendor-specific RDMA command, devoid of the protocol header and footer, may be sent to the firmware/controller 111 by the verb handler/RDMA packet handler 109 as signal 2. The firmware/controller 111 may identify the information contained in the vendor-specific RDMA command such as the priorities of RDMA queue pairs, the weights of RDMA queue pairs and the QIDs, and may send this information to the arbitration mapping table 113 as signal 3. The arbitration mapping table 113 may store/populate the priorities of RDMA queue pairs, the weights of RDMA queue pairs and the QID in a table format, as shown in FIG. 1. In alternate embodiments, it shall be understood that the type of data structure used is not limited to a table.

Since the information contained in the vendor-specific RDMA command also needs to be sent to the target RNIC 105, the vendor-specific RDMA command may be sent to the arbitrator 115 by the firmware/controller 111 as signal 4. The arbitrator 115 may receive the vendor-specific RDMA command and may send the vendor-specific RDMA command to the virtual lanes 117 as signal 5. The virtual lanes 117 may further send the vendor-specific RDMA command to the OSI model layers 119 as signal 6. The OSI model layers 119 may include a User Datagram Protocol (UDP/IP/IB) layer, a Media Access Control (MAC) layer and a PHYsical (PHY) layer. The OSI model layers 119 may create their own protocol header and footer to the vendor-specific RDMA command to make network packets, which are sent to the target RNIC 105 as shown in FIG. 1. Here, the OSI model layers 119 may be collectively referred to as a physical port.

The target RNIC 105 may receive the network packets from the host RNIC 103. Analogous to the host RNIC 103, the target RNIC 105 may include components such as a physical port or OSI model layers 121, a verb handler/RDMA packet handler 123, a firmware/controller 125, an arbitration mapping table 127, an arbitrator 129, and virtual lanes 131. The physical port 121 of the target RNIC 105 may receive the network packets from the physical port 119 of the host RNIC 103, and send as signal 7 to the verb handler/RDMA packet handler 123 of the target RNIC 105. The handler 123 may remove a protocol header and/or footer from the vendor-specific RDMA command. The vendor-specific RDMA command devoid of the protocol header and footer may be sent to the firmware/controller 125 by the verb handler/RDMA packet handler 123 as signal 8. The firmware/controller 125 may identify the information contained in the vendor-specific RDMA command, such as the priorities of RDMA queue pairs, the weights of RDMA queue pairs and the QIDs, and may send this information to the arbitration mapping table 127 as signal 9. The arbitration mapping table 127 may store/populate the priorities of RDMA queue pairs, the weights of RDMA queue pairs and the QIDs in a table format, as shown in FIG. 1. The information stored in the arbitration mapping table 127 of the target RNIC 105 may thereby be matched to the information stored in the arbitration mapping table 113 of the host RNIC 103. For example, the host RNIC 103 and the target RNIC 105 may both have a common mapping table. Once the arbitration mapping table 127 of the target RNIC is populated with the information containing the priorities of RDMA queue pairs, the weights of RDMA queue pairs and the QIDs; the initialization process of the RDMA queues in the host RNIC and the target RNIC of an NVMe-aware RDMA network is completed. Once initialized, RDMA commands may be sent to the arbitrator 129 by the firmware/controller 125 as signal 10.

Figure 2:
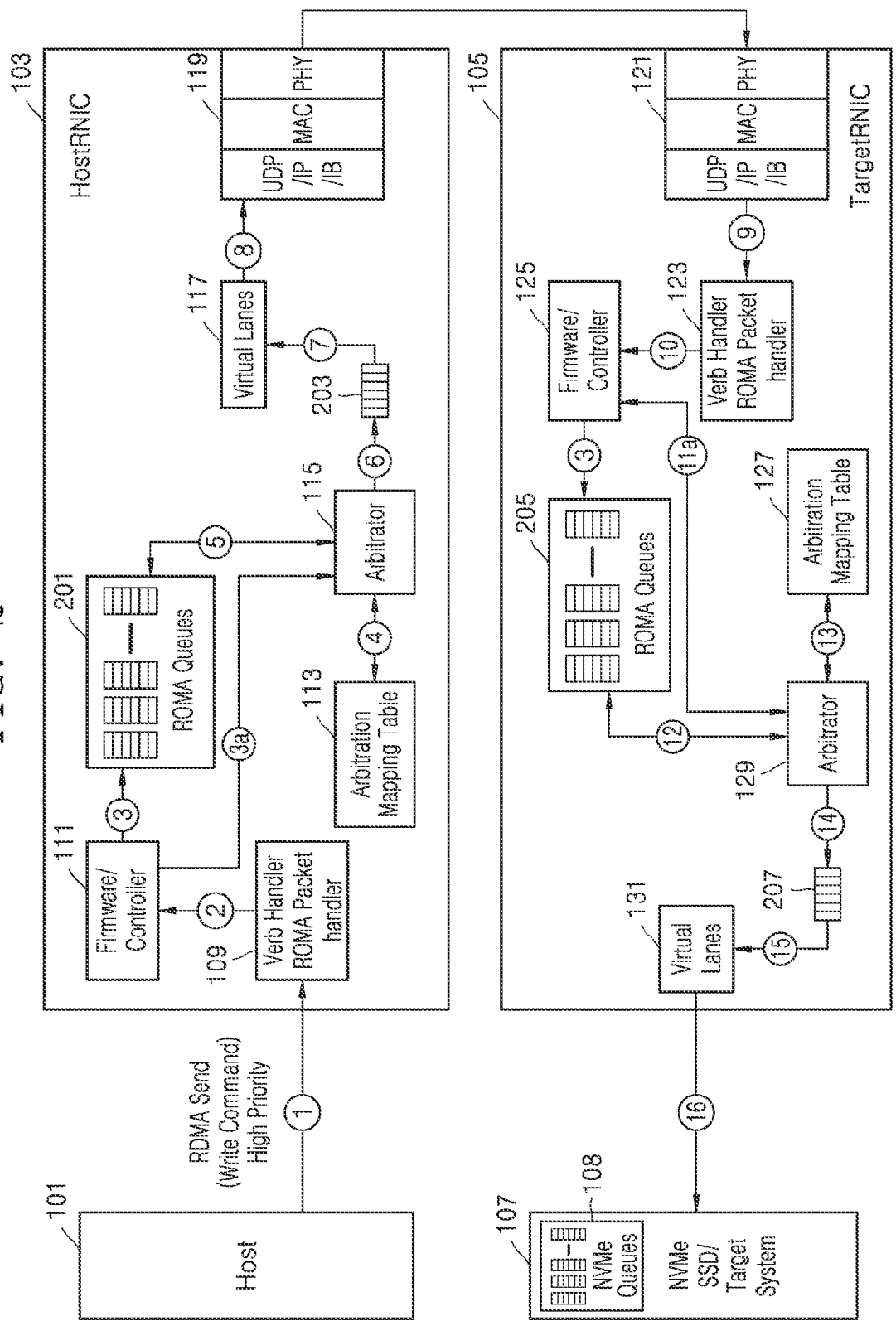
FIG. 2 is a hybrid schematic block diagram illustrating RDMA command execution in a host RNIC and a target RNIC in an NVMe-aware RDMA network in accordance with an exemplary embodiment of the present disclosure.

FIG. 2 illustrates an RDMA command execution in a host RNIC and a target RNIC in an NVMe-aware RDMA network in accordance with an exemplary embodiment of the present disclosure. With reference to the FIG. 2, the transfer of data packets from a host device to a target device through a host RNIC and a target RNIC is explained. Here, the target device is an NVMe SSD device, but the present disclosure is not limited thereto. For example, the target device may include one or more hard disk drives or other memories, such as but not limited to non-volatile memories.

As shown in the FIG. 2, the host 101 is communicatively coupled to the host RNIC 103, which is communicatively coupled to the target RNIC 105, which, in turn, is communicatively coupled to the NVMe SSD/target system 107. In addition to components contained in the host RNIC 103 as explained in the FIG. 1, for which duplicate description may be omitted, the host RNIC 103 may include components such as RDMA queues 201 and a host queue 203. Similarly, in addition to components contained in the target RNIC 105 as explained in the FIG. 1, for which duplicate description may be omitted, the target RNIC 105 may include components such as RDMA queues 205 and a target queue 207.

The host 101 may initiate an RDMA command such as an RDMA Send command among other RDMA commands. The RDMA command may include data packets. In the command execution process, the host 101 may transmit the RDMA command to the host RNIC 103 as signal 1. The verb handler/RDMA packet handler 109 of the host RNIC 103 may receive the signal 1 and remove a protocol header and footer from the RDMA command. The RDMA command devoid of the protocol header and footer may be sent to the firmware/controller 111 by the verb handler/RDMA packet handler 109 as signal 2. The firmware/controller 111 may use signal 3 to keep/store the RDMA command such as data packets in the RDMA queues 201. The data packets are then available in the RDMA queues 201. At the same time, the firmware/controller 111 may also use signal 3a to inform the arbitrator 115 about the RDMA command. The arbitrator 115 may use bi-directional signal 4 to check the arbitration mapping table 113 from which the arbitrator 115 may get the information on priority and weights to be considered for the RDMA queue. Based on the priority and weights obtained from the arbitration mapping table 113, the arbitrator 115 may use bi-directional signal 5 to fetch the data packets from the RDMA queue 201, and may send them to the host queue 203 as signal 6. In the host queue 203, the data packets are arranged in a First-In-First-Out (FIFO) format. The data packets may be sent as signal 7 to the virtual lanes 117. The virtual lanes 117 may use signal 8 to send the data packets to the OSI model layers 119. The OSI model layers 119 may add their own protocol header and footer to the data packets to make network packets, and may send the network packets to the target RNIC 105, over an interface, such as but not limited to a network interface.

The OSI model layers 121 of the target RNIC 105 may receive the network packets from the host RNIC 103, and send them as signal 9 to the verb handler/RDMA packet handler 123. The handler 123 of the target RNIC 105 may remove a protocol header and/or footer from the RDMA command, such as from the data packets. The RDMA command devoid of the protocol header and footer may be sent to the firmware/controller 125 by the verb handler/RDMA packet handler 123 as signal 10. The firmware/controller 125 may use signal 11 to keep/store the RDMA command such as data packets in the RDMA queue 205. Now the data packets are available in the RDMA queue 205. At the same time, the firmware/controller 125 may also use signal 11a to inform the arbitrator 129 about the RDMA command. The arbitrator 129 may use bi-directional signal 13 to check the arbitration mapping table 127 from which the arbitrator 129 may get the information on priority and weights to be considered for the RDMA queues. Based on the priorities and weights obtained from the arbitration mapping table 127, the arbitrator 129 may use bi-directional signal 12 to fetch the data packets from the RDMA queue 205, and may send them as signal 14 to the target queue 207. In the target queue 207, the data packets are arranged in the FIFO format. The data packets may be sent as signal 14 to the virtual lanes 131. The virtual lanes 131 of the target RNIC 105 may send the received data packets to the NVMe SSD/target system 107 as signal 16. This completes the execution of an RDMA Send command initiated by the host 101.

Figure 3:
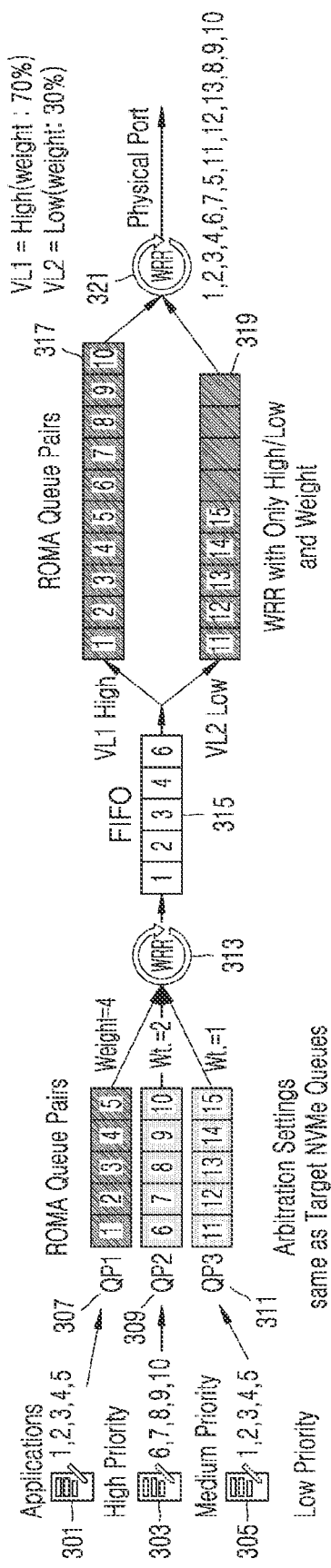
FIG. 3 is a schematic data diagram illustrating an exemplary operation of a host RNIC in an NVMe-aware RDMA network in accordance with an exemplary embodiment of the present disclosure.

FIG. 3 illustrates an operation of a host RNIC in an NVMe-aware RDMA network in accordance with an exemplary embodiment of the present disclosure. With reference to FIG. 3, host applications with high priority 301 may include application 1, application 2, application 3, application 4 and application 5 (henceforth, referred as 1, 2, 3, 4 and 5). Host applications with medium priority 303 may include application 6, application 7, application 8, application 9 and application 10 (henceforth, referred as 6, 7, 8, 9 and 10). And host applications with low priority 305 may include application 11, application 12, application 13, application 14 and application 15 (henceforth, referred as 11, 12, 13, 14 and 15).

Here, the Input Output (IO) requests from the applications may be referred to as either data packets or WQEs. These data packets from the applications are submitted to host RDMA queue pairs based on priorities of the applications and corresponding priorities of RDMA queue pairs. For example, applications such as 1, 2, 3, 4 and 5 with high priority are arranged in QP1 307 of a host RDMA queue pair that has high priority; applications 6, 7, 8, 9 and 10 with medium priority are arranged in QP2 309 of a host RDMA queue pair that has medium priority, and applications 11, 12, 13, 14 and 15 with low priority are arranged in QP3 311 of a host RDMA queue pair that has low priority. Thus, these RDMA queue pairs use the same arbitration settings as the target NVMe queues.

In the next step, data packets arranged in the host RDMA queue pairs are stored in a host queue 315 based on weights and priorities of the RDMA queue pairs. In FIG. 3, QP1 307 has a weight of 4, QP2 309 has a weight of 2 and QP3 311 has a weight of 1. The host queue 315 uses a FIFO queue scheme. Based on a weighted round-robin (WRR) selector 313 and the priorities of the RDMA queue pairs, using the same arbitration settings as the target NVMe queues, the host queue 315 stores 1, 2, 3, 4, 6, 7 and 11. That is, the first four of high priority, the first two of medium priority and the first one of low priority are placed into the host queue 315. Here, 1, 2, 3 and 4 are from QP1 307 as it has the weight of 4. Similarly, 6 and 7 are from QP2 309 as it has the weight of 2; and 11 is from QP3 311 as it has the weight of 1. Subsequently, the host queue 315 stores 5, 8, 9, 12, 10, 13, 14 and 15 in FIFO format after 1, 2, 3, 4, 6, 7 and 11. The weighted round-robin parameters of WRR selector 313 may be used before the queues 203, 207 and 315, and are derived from the same queue arbitration settings as the target system NVMe SSD 107.

In the next step, applications stored in the host queue 315 are stored in host virtual lanes based on the priorities of the applications and corresponding host RNIC virtual lane priorities. Here, the host virtual lanes include VL1 317 having high priority and VL2 319 having low priority. That is, where there are fewer virtual lanes than priority levels, the lanes may be configured to pass data packets of multiple priorities. An alternate embodiment might distribute the medium priority packets between the lower virtual lane and the upper virtual lane. Yet another embodiment might use the lower virtual lane for the medium and low priority packets while using the upper lane for the high priority packets. The weighted round-robin parameters of WRR selector 321 may be used after the virtual lanes 117, 317, 319 and 131, and are also derived from the same queue arbitration settings as the target system NVMe SSD 107.

In an exemplary embodiment, the host RNIC virtual lane priorities may be changed based on the preferences of different RNIC vendors using a virtual lanes vendor arbitration format (VLVAF) of the target RNIC. Here, the application data packets having high and medium priorities such as 1, 2, 3, 4, 6, 7, 5, 8, 9 and 10 are stored, in that FIFO order, in VL1 317 having higher priority and the application data packets having low priority such as 11, 12, 13, 14 and 15 are stored in VL2 319 having lower priority. In the next step, the data packets in the host virtual lanes are sent to a physical port 119 based on a VLVAF of the host RNIC. Here, the VLVAF of the host RNIC has a WRR selector 321 with VL1 317 having weight 7 and VL2 319 having weight 3. Based on this WRR selector 321 using only a higher lane, a lower lane and weights, the physical port receives the first seven data packets from VL1 and the next three data packets from VL2 forming 1, 2, 3, 4, 6, 7, 5, 11, 12 and 13. Here, 1, 2, 3, 4, 6, 7 and 5 are from VL1 317 as it has the weight of 7. Similarly, 11, 12 and 13 are from VP2 319 as it has the weight of 3. Subsequently, the physical port receives 8, 9, 10, 14 and 15 after receiving 1, 2, 3, 4, 6, 7, 5, 11, 12 and 13. The output of the physical port 119 is sent to the target RNIC 105.

The host virtual lane arbitration format may be changed based on the preferences of different RNIC vendors. Thus, an embodiment where the data packets of high and medium priorities share one higher priority virtual lane, while the data packets of low priority exclusively used another lower priority virtual lane, had a preferred effect with respect to five data packets of high priority, but passed only two out of five of the medium priority data packets before passing three out of five of the low priority data packets. However, the scheme resulted in all five medium priority packets being passed before the last two of the five low priority packets were passed. In addition, a threshold priority between the higher and lower lanes may be adaptively adjusted based on the median priority level of the data packets in the FIFO buffer 315. Moreover, the same scheme may be used on the host RNIC 103, the target RNIC 105, and the target device 107.

Figure 4:
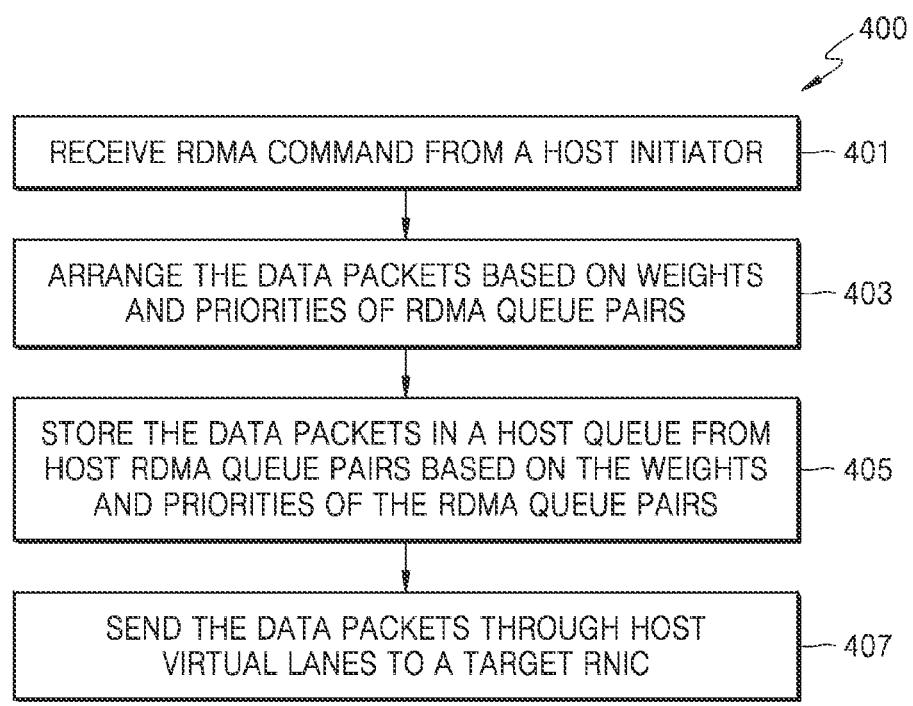
FIG. 4 is a schematic flowchart diagram showing a method for sending data packets by a host RNIC in an NVMe-aware RDMA network in accordance with an exemplary embodiment of the present disclosure.

FIG. 4 illustrates a flowchart showing a method for sending data packets by a host RNIC in an NVMe-aware RDMA network in accordance with an exemplary embodiment of the present disclosure. As illustrated in FIG. 4, the method 400 includes one or more steps or functions for sending data packets by a host RNIC in the NVMe-aware RDMA network. The method 400 may be described in the general context of computer executable instructions. Generally, computer executable instructions may include routines, programs, objects, components, data structures, procedures, modules, and functions, which perform particular functions or implement particular abstract data types, and may be implemented at least partially in parallel.

The order in which the method 400 is described is not intended to be construed as a limitation, and any number of the described method functions may be combined in any order to implement the method. Additionally, individual functions may be deleted from alternate embodiment methods without departing from the scope of the subject matter described herein. Furthermore, the method can be implemented in any suitable hardware, software, firmware, or combination thereof.

At function block 401, a host RNIC 103 receives an RDMA command from an initiating host 101. Here, the RDMA command includes data packets. The data packets may have priorities, such as, for example, high priority, medium priority and/or low priority.

At block 403, the host RNIC 103 arranges the data packets based on weights and priorities of RDMA queue pairs 201. Here, the priorities of the RDMA queue pairs include high, medium and low priority.

At block 405, the host RNIC 103 stores the data packets in a host queue 203 from the host RDMA queue pairs 201 based on the weights and priorities of the RDMA queue pairs. The weights may be in weighted round-robin format implemented by a WRR selector. Furthermore, the host queue 203 is a host FIFO queue, although not limited thereto.

At block 407, the host RNIC 103 sends the data packets through host virtual lanes 117 to a target RNIC 105. Here, the sending of the data packets through host virtual lanes 117 to a target RNIC 105 includes placing the data packets from the host queue 203 into the host virtual lanes 117. The placing is based on the host RNIC vendor's virtual lane priorities. Subsequently, the data packets are sent by the host RNIC 103 based on the VLVAF of the host RNIC to the target RNIC 105 via a physical port 119.

Figure 5:
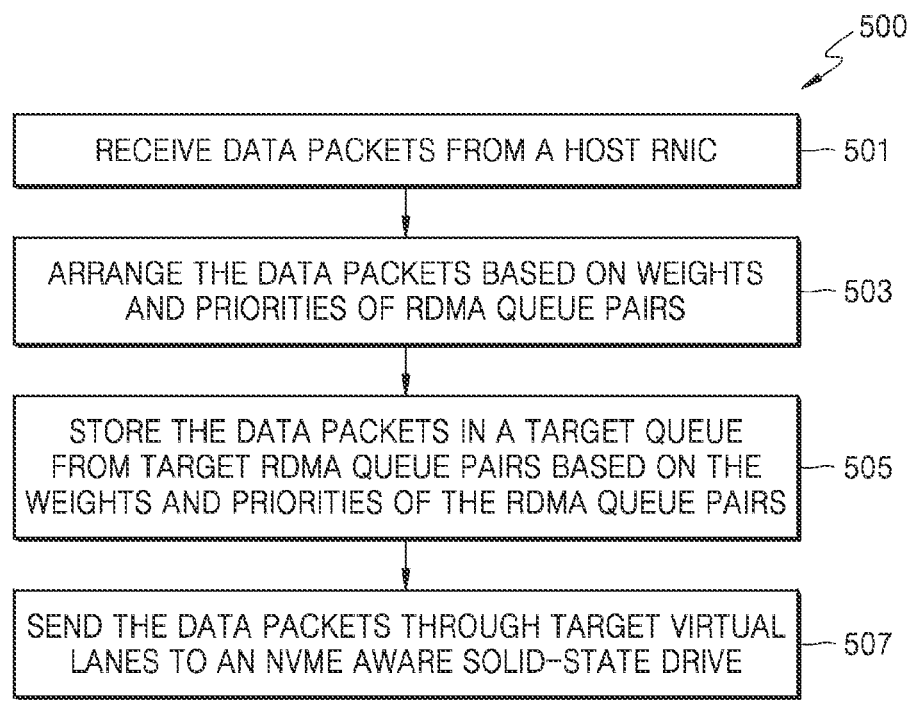
FIG. 5 is a schematic flowchart diagram showing a method for receiving data packets by a target RNIC in an NVMe-aware RDMA network in accordance with an exemplary embodiment of the present disclosure.

FIG. 5 illustrates a flowchart showing a method for receiving data packets by a target RNIC in an NVMe-aware RDMA network in accordance with an exemplary embodiment of present disclosure. As illustrated in FIG. 5, the method 500 includes one or more steps or functions for receiving data packets by a target RNIC in NVMe-aware RDMA network. The method 500 may be described in the general context of computer executable instructions. Generally, computer executable instructions can include routines, programs, objects, components, data structures, procedures, modules, and functions, which perform particular functions or implement particular data types, and may be implemented at least partially in parallel.

The order in which the method 500 is described is not intended to be construed as a limitation, and any number of the described method functions may be combined in any order to implement the method. Additionally, individual functions may be deleted from the methods without departing from the scope of the subject matter described herein. Furthermore, the method can be implemented in any suitable hardware, software, firmware, or combination thereof.

At block 501, a target RNIC 105 receives data packets from a host RNIC 103. The data packets may have priorities, for example, high priority, medium priority and/or low priority.

At block 503, the target RNIC 105 arranges the data packets based on weights and priorities of RDMA queue pairs 205. Here, the priorities of the RDMA queue pairs include high, medium and low priorities.

At block 505, the target RNIC 105 stores the data packets in a target queue 207 from the target RDMA queue pairs 205 based on the weights and priorities of the RDMA queue pairs. The weights may be in a weighted round-robin format for a WRR selector. Furthermore, the target queue 207 may be a target FIFO queue.

At block 507, the target RNIC 105 sends the data packets through target virtual lanes 131 to an NVMe-aware SSD 107. Here, the sending of the data packets through target virtual lanes 131 to an NVMe-aware SSD 107 includes storing the data packets from the target queue 207 in the target virtual lanes 131. The storing is carried out based on target RNIC virtual lanes priorities predetermined by the host RNIC vendor. Subsequently, the data packets are sent by the target RNIC 105 based on the VLVAF of the target RNIC to the NVMe-aware SSD 107.

The illustrated operations of FIGS. 4 and 5 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The present disclosure provides an efficient mechanism for overcoming the problem of mismatch in the arbitration policies between RNICs and target SSD by storing queue arbitration setting in arbitration mapping table of the host RNIC and the target RNIC that matches with the queue arbitration setting of the NVMe-aware SSD.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor or a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, or the like). Further, non-transitory computer-readable media include all computer-readable media except for a transitory. The code implementing the described operations may further be implemented in hardware logic (e.g., an integrated circuit chip, Programmable Gate Array (PGA), Application Specific Integrated Circuit (ASIC), etc.).

The terms "an exemplary embodiment", "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise. The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary, a variety of optional components are described to illustrate a wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While exemplary aspects and embodiments have been disclosed herein, other aspects and embodiments of the present disclosure will be apparent to those of ordinary skill in the pertinent art. The various aspects and embodiments disclosed herein are for purposes of illustration, and are not intended to be limiting. The full scope and spirit of the invention shall be limited only by the following claims.

What is claimed is:

1. A method for sending data packets from a host remote direct memory access (RDMA) network interface controller (RNIC) through a RDMA network, the method comprising:

receiving, by the host RNIC, an RDMA command, wherein the RDMA command comprises data packets;

arranging, by the host RNIC, the data packets based on weights and priorities of host RNIC RDMA queue pairs in accordance with an arbitration format, wherein the arbitration format is a Non-Volatile Memory express (NVMe)-aware arbitration format;

storing, by the host RNIC, the data packets in a host RNIC queue from the host RNIC RDMA queue pairs based on the weights and priorities of the host RNIC RDMA queue pairs; and sending, by the host RNIC, the data packets through host RNIC virtual lanes to the RDMA network.

2. The method as claimed in claim 1,
wherein the priorities of the host RNIC RDMA queue pairs are transmitted by a host initiator to the host RNIC and to a target RNIC using a vendor-specific command in accordance with the arbitration format.

3. The method as claimed in claim 1,
wherein the priorities of the data packets and the host RNIC RDMA queue pairs comprise high, medium and low priorities, and
wherein the storing of the data packets in the host RNIC queue from the host RNIC RDMA queue pairs is based on a weighted round-robin scheme using the weights and high, medium and low priorities of the host RNIC RDMA queue pairs.

4. The method as claimed in claim 1, wherein the host RNIC queue is a First-In First-Out (FIFO) queue.

5. The method as claimed in claim 1, wherein the RDMA network comprises a target RNIC, the method further comprising:
storing, by the host RNIC, the data packets from the host RNIC queue in the host RNIC virtual lanes based on host RNIC virtual lane priorities preselected by a host initiator; and
sending, by the host RNIC, the data packets from the host RNIC virtual lanes using a weighted round-robin scheme based on a Non-Volatile Memory express (NVMe)-aware arbitration format to the target RNIC via at least one physical port.

6. A host remote direct memory access (RDMA) network interface controller (RNIC) for sending data packets in a non-volatile memory express (NVMe)-aware RDMA network, the host RNIC comprising:
a processor; and
a memory communicatively coupled to the processor,
wherein the memory stores processor-executable instructions, which on execution, cause the processor to:
receive an RDMA command from a host initiator, wherein the RDMA command comprises data packets;
arrange the data packets based on weights and priorities of host RNIC RDMA queue pairs in accordance with an arbitration format, wherein the arbitration format is a Non-Volatile Memory express (NVMe)-aware arbitration format;
store the data packets in a host RNIC queue from the host RNIC RDMA queue pairs based on weights and priorities of the host RNIC RDMA queue pairs; and
send the data packets through host RNIC virtual lanes to a target RNIC in the RDMA network.

7. The host RNIC as claimed in claim 6, wherein the priorities of the host RNIC RDMA queue pairs are transmitted by the host initiator to the target RNIC through the host RNIC using a vendor-specific command.

8. The host RNIC as claimed in claim 6,
wherein the priorities of the host RNIC RDMA queue pairs comprise high, medium and low priorities, and
wherein the storing of the data packets in the host RNIC queue from the host RNIC RDMA queue pairs is based on weights and priorities of the host RNIC RDMA queue pairs.

9. The host RNIC as claimed in claim 6, wherein the host RNIC queue is a First-In First-Out (FIFO) queue.

10. The host RNIC as claimed in claim 6, wherein the host RNIC causes the processor to:
store the data packets from the host RNIC queue in the host RNIC virtual lanes based on host RNIC virtual lane priorities predetermined by a remote memory device vendor; and
send the data packets through the host RNIC virtual lanes based on a remote memory device vendor arbitration format to the target RNIC via at least one physical port.

11. A target remote direct memory access (RDMA) network interface controller (RNIC) for receiving data packets in a non-volatile memory express (NVMe)-aware RDMA network, the target RNIC comprising:
a processor; and
a memory communicatively coupled to the processor,
wherein the memory stores processor-executable instructions, which on execution, cause the processor to:
receive data packets from a host RNIC;
arrange the data packets based on weights and priorities of target RNIC RDMA queue pairs in accordance with an arbitration format, wherein the arbitration format is a Non-Volatile Memory express (NVMe)-aware arbitration format;
store the data packets in a target RNIC queue from the target RDMA queue pairs based on weights and priorities of the target RNIC RDMA queue pairs; and
send the data packets through target RNIC virtual lanes to an NVMe-aware solid-state drive (SSD).

12. The target RNIC as claimed in claim 11, wherein the priorities of the target RNIC RDMA queue pairs are received by the target RNIC from a host initiator through the host RNIC using a vendor-specific command corresponding to a remote memory device.

13. The target RNIC as claimed in claim 11,
wherein the priorities of the data packets and the target RNIC RDMA queue pairs comprise high, medium and low priorities, and
wherein the storing of the data packets in the target RNIC queue from the target RNIC RDMA queue pairs is based on weights and priorities of the target RNIC RDMA queue pairs.

14. The target RNIC as claimed in claim 11, wherein the target RNIC queue is a First-In First-Out (FIFO) queue.

15. The target RNIC as claimed in claim 11, wherein the target RNIC causes the processor to:
store the data packets from the target RNIC queue in the target RNIC virtual lanes using virtual lane priorities based on those of the NVMe-aware SSD; and
send the data packets through the target RNIC virtual lanes to the NVMe-aware SSD based on a vendor arbitration format of the NVMe-aware SSD.

* * * * *